March 6, 1934.     P. DAVEY     1,949,603
INSTRUMENT FOR STUDYING VIBRATIONS AND FOR OTHER PURPOSES
Filed Oct. 13, 1928     2 Sheets-Sheet 1
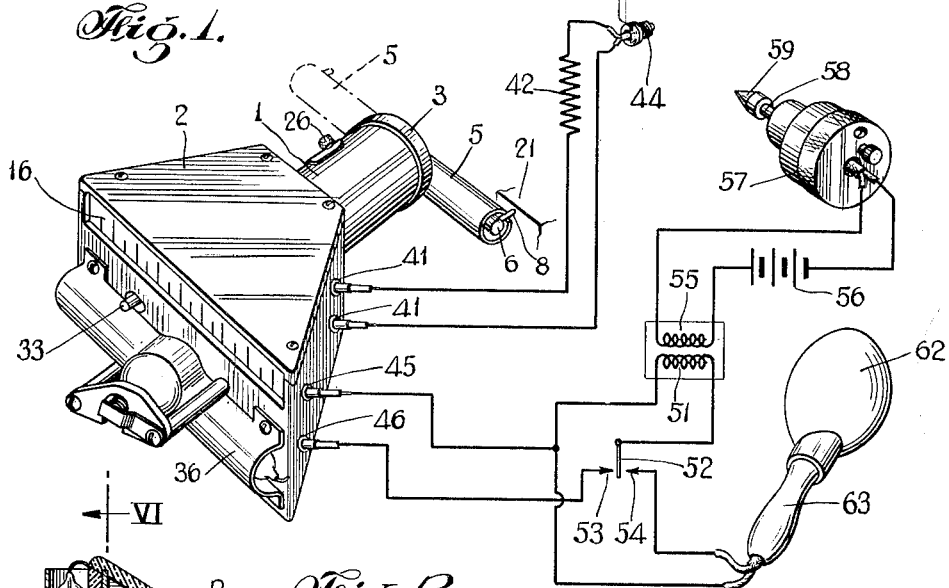
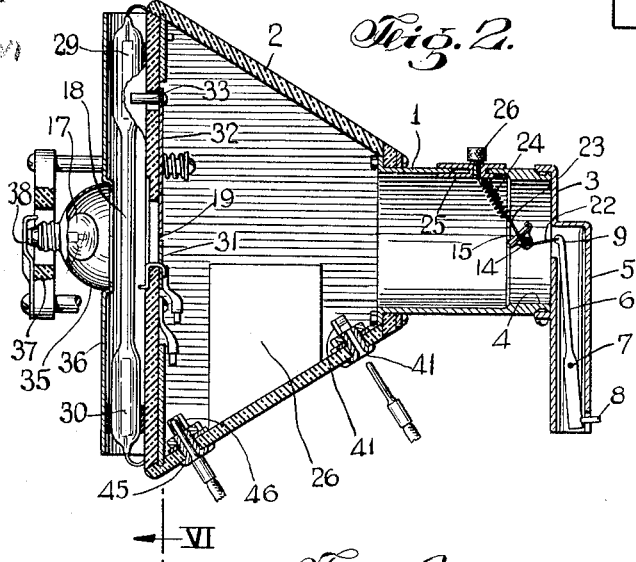
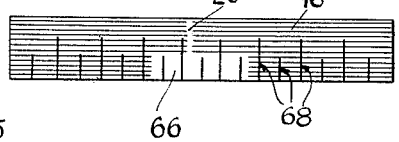
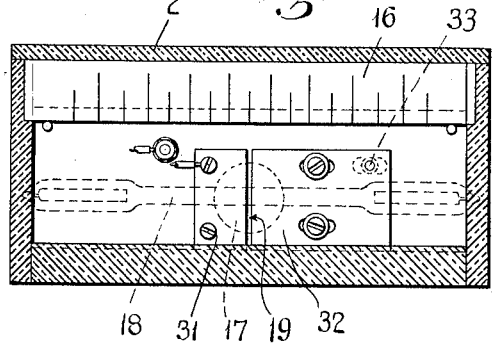
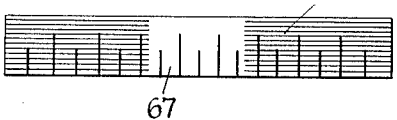
INVENTOR.
Peter Davey
BY
ATTORNEYS.

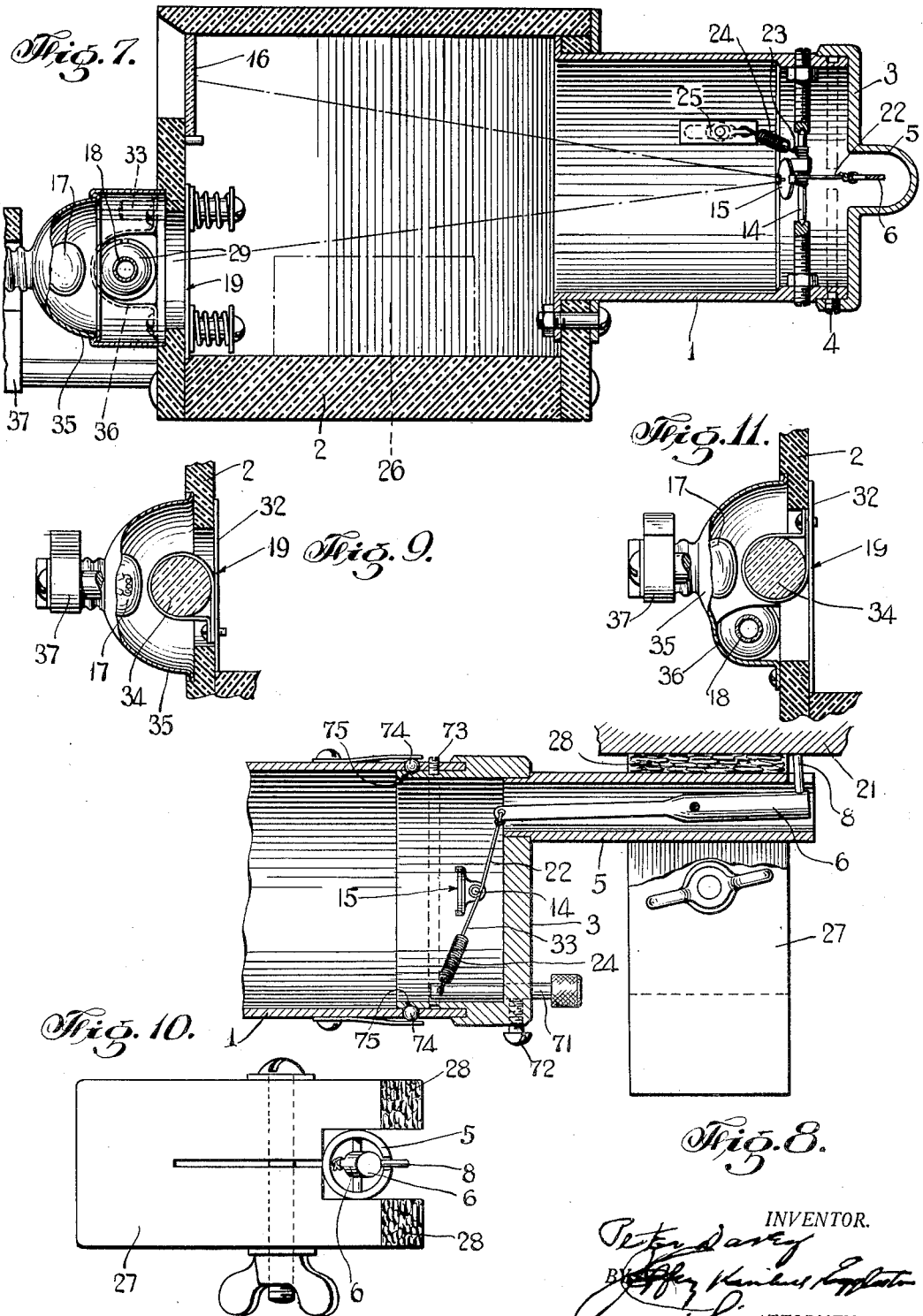

Patented Mar. 6, 1934

1,949,603

UNITED STATES PATENT OFFICE 1,949,603

INSTRUMENT FOR STUDYING VIBRATIONS AND FOR OTHER PURPOSES

Peter Davey, Woodstock, N. Y., assignor to Vibroscope, Inc., New York, N. Y., a corporation of New York Application October 13, 1928, Serial No. 312,305

17 Claims. (Cl. 73—51)

One object of my invention is to provide an improved instrument to measure the amplitude of mechanical vibrations in or of bodies. It may be used also to measure other small distances.

Another is to provide an apparatus for showing time or phase relations between the vibrations at a body or repeated displacements in some certain direction, and some other repeating or cyclic phenomenon; and apparatus whereby both impulsive electric currents and supplementary apparatus, for example a stroboscope, can be timed or brought into a desired phase relation with vibrations.

Another object is to provide apparatus having all these functions.

Still another object is to provide an improved type of instrument of the kind indicated, and especially to provide a type of construction suitable for a small portable instrument adapted for general use about both moving machinery and fixed structures of all kinds, of a high degree of accuracy, capable of measuring very small vibrations, and sufficiently rugged for ordinary factory use.

The invention can best be understood from the following description of the embodiments illustrated in the accompanying drawings, in which Fig. 1 is a perspective of an instrument of my invention, electrical connections for lighting the lamps of the instrument, and also an associated stroboscopic apparatus, being shown diagrammatically in connection therewith. Fig. 2 is a horizontal section through the instrument of Figure 1. Figs. 3, 4 and 5 show the scale of the instrument of Figs. 1 and 2, and also various of the light effects produced thereon when the instrument is in use. Fig. 6 is a vertical section on the line VI—VI of Fig. 2. Fig. 7 is another vertical section of the same instrument, at right angles to the showing of Fig. 6. Fig. 8 is a horizontal section showing a modification at one end of the instrument of Fig. 1. Fig. 9 is a detail illustrating a construction in which the phase determining or timing illuminator of the instrument of Figs. 1, 2, 6 and 7 is omitted. Fig. 10 illustrates how the instrument can be adapted for ready use in the hand. Fig. 11 illustrates a modification of the construction of Figs. 1, 2, 6 and 7.

The base, as I term it, of the instrument illustrated, comprises a casing, one part 1 of which is cylindical and the second part 2 of which flares away from the cylindrical portion 1 as shown in Figs. 1 and 2 to accommodate the light rays as will be understood from the further description. On the outer end of the cylindrical portion 1 is a circular head 3 which is attached to the cylindrical portion 1 by means of a pin 4 riding in a circumferential groove whereby the head 3 may be rotated on the cylinder 1. Preferably, as shown in Fig. 7, this groove extends nearly, but not quite entirely around the cylinder 1, so that the head 3 may be turned nearly 360°, but can not be turned around a number of times in the same direction; this is to prevent undue twisting of the filamentary connection to the mirror hereafter described. As a part of the head 3, a hollow tube 5 projects radially to act as a shield and support for the lever 6 which is pivoted within the tube at 7 and is provided with a pin 8 projecting through a slot near the end of the tube as shown. Usually I so place the pivot 7 that the arm of the lever carrying the pin 8 is shorter than, say onehalf the length of, the opposite arm of the lever, whereby the point 9 on the lever is made to move greater distances than the pin 8. In the end of the cylinder 1 near the head is mounted a spindle 14 of as small diameter as convenient, and on which is fixed a small mirror 15 to reflect onto the screen 16 light coming from the light sources 17 and 18. Preferably this is a concave mirror, and is concaved on such a radius that light reflected onto the screen 16 from either of the light sources 17 or 18 is substantially concentrated or focussed at the screen and thereby the light image formed on the screen is made more visible. A shield with a vertical slot 19 interposed between the light source or sources and the mirror 15, gives the image sharp edges crosswise of the screen as appears from the narrow vertical beam 20 shown in Figs. 3 and 4. It will be understood from the drawings that the screen 16 is placed at right angles to the spindle 14. Attached to the spindle 14 and wrapped a few turns around it, is a fine flexible filament 22, for example a thread of slightly twisted silk, the opposite end of which is tied to the lever 6 at point 9. Likewise another similar filament 23 is attached to the spindle 14 and wrapped a few turns around it and this filament is tied to a light spring 24, the tension of which can be adjusted by sliding the plate 25 to which the spring is attached and which is mounted in a slot in the wall of the cylinder 1; a threaded bolt 26 provides for locking the slide 25 at any point in the slot. The filaments 22 and 23 are so wrapped around the spindle 14 that thrusting the pin 8 to the left from the position shown in Fig. 2, turns the spindle 14 against the tension of the spring 24, and the spring 24 turns the spindle and the lever 6 in the reverse direction when pressure on the pin 8 is released. The elements of the system 6, 22, 14, 15, 23 and 24 are intended to be quite light, in weight, and the whole is so designed that the system has a natural period of movement smaller than the period of the vibrations to be shown and measured by the instrument; by moving the slide 25, the period of the system can be adjusted somewhat. Consequently the pin 8 remains in contact with the vibrating body it is placed against and the vibrations of the body are exactly reproduced in the swinging of the mirror 15 and the movement of the light images at 16. In use the instrument is usually placed on a stand with the pin 8 resting against the vibrating body 21 and with the tube 5 so close to the vibrating body that the lever 6 swings freely within the tube. If necessary to give it sufficient stability to remain at rest, a weight 26 can be fastened within the case. In the alternative, the case can be rested on the vibrating body and the pin 8 rested against a non-moving body or structure. Or the case can be held in the hand with the pin 8 rested against the vibrating body. Particularly for this last, a weight 27 can be clamped to the tube 5 (Figs. 8 and 10) and faced at 28 with a resilient material such as sponge rubber, through which the instrument can be pressed to the vibrating body 21 (see Fig. 8) until pin 8 contacts with the body, and thus the instrument can be used by merely pressing it against the vibrating body.

Since the lever arm 9—7 is longer than the lever arm 7—8, and also because of the small diameter of the spindle 14 around which the filament 22 is wrapped, it is evident that the amplitude of movement of the mirror 15 is or can be made to be greater than the amplitude of the vibrations producing the movement. The amplitude of movement or of the displacement of the light images appearing on the screen 16 when the pin 8 is subjected to vibration relative to the base is further magnified, that is to say is made still greater than the amplitude of the vibrations of the body under observation, by reason of the relation of the light sources and the screen to the mirror; it is apparent that the distance the light image moves or is displaced on the screen for any given movement of the mirror is dependent on the distance of the light source from the mirror as compared to the distance from the reflecting plane of the mirror to the axis of the spindle 14, and also is dependent on the distance between the mirror and the screen. By suitable proportioning and placement of the various parts of the instrument, a magnification of some hundreds of times is readily obtained, so that vibrations having an amplitude of but a thousandth of an inch can not only be shown by movement of the light image on the screen, but also can be shown by such considerable movements or displacements of the light images as to be both accurately and readily measured. The purpose of making the head 3 rotatable on the cylinder 1 is to permit the lever 6 to be swung about the axis of the instrument so that the pin 8 can be applied to vibrating bodies in various positions while the screen 16 remains about horizontal, as it will usually be placed in use (see Fig. 1 for example, which indicates the guard tube 5 in two opposite positions). It will be observed that the point 9, the point to which the filament 22 is tied to the lever 6, lies in the axis of rotation of the head 3, so that rotation of the head 3 to bring the pin 8 to a convenient position, does not disturb the adjustment and operation of the instrument except in so far as the filament 22 may be twisted, and as before explained the amount this filament can be twisted is limited to less than one complete turn by the slot in which the pin 4 rides. It will be understood that the mirror 15 is but one possible form of a light obstructing member movable by the vibrations to be examined and capable of casting an image on a screen or other receiver for the image, albeit it is the form which I prefer and have found most convenient. In the present instance the screen 16 is translucent and the light image is seen through it, although this is not entirely essential, as will be apparent.

In some instances a source 17 of continuous light will be sufficient. In other instances a source 18 of intermittent or flashing light will be desired, flashing at intervals, usually under the control of the observer, both as to its frequency and as to the phase or time relation of the flashes to the vibrations being studied. Both sources of light can be employed in the same instrument if desired. The source 17 of continuous light is preferably an ordinary incandescent electric lamp; it can be a low voltage lamp such as is used in flashlights. The source 18 of flashing light can be and preferably is a neon tube, the tubular portion of which (the portion in which the light or maximum part of the light is produced) being placed in front of and at right angles to the slot 19. The electrodes for the tube 18 are shown at 29 and 30. When both sources 17 and 18 are to be employed in the same instrument and the glass of 18 is sufficiently perfect, the tubular portion of 18 may be placed between 17 and 19; then when the flashing source 18 is not in operation, the round tube of this source acts as a lens to spread out vertically the light coming from the continuous source 17, that is to say to spread it out and equalize the illumination from 17 in a plane containing the spindle 14. This action, in co-operating with the slot at 19, causes the image thrown on the screen 16 by the mirror when 17 is the illuminator and the pin 8 is at rest in its midposition, to be a narrow vertical line such as shown at 20 in Figs. 3 and 4. In order that this line image may be broad or narrow as the user may wish, I preferably form the slot 19 by a fixed plate 31 and a plate 32 which is so mounted that it can be pushed along to and from the edge of the plate 31 by means of the finger piece 33 which extends through a slot in the face of the instrument (Figs. 1 and 2). If the flashing source of light 18 is to be omitted, I produce the same lens effect by a short length of round glass rod 34 as illustrated in Fig. 9. If 18 should not provide a satisfactory lens for 17, or if necessary in order to obtain the desired relative placements of the light images, one of these two sources can be located above the other (Fig. 11), and a lens 34 provided for 17, and another for 18 also if desired. Back of the source 17 of continuous light may be provided an ordinary reflector 35. The lamp 17 can be screwed into this reflector as in flashlight practice. The metallic tube 36 serves as a shield and support for the neon tube 18. Conveniently this tube 36 is fastened direct to the face of the casing 2 (Fig. 1), and the reflector 35 carrying the lamp 17 is held in place by a bracket 37 which itself serves as one of the electrical connections to the lamp 17, the electrical connection to the center terminal of the lamp being provided by a flat spring member 38 also carried by but insulated from the bracket 37. This bracket 37 may press the reflector 35 against the shield 36 of the neon tube 18 as illustrated in Figs. 1 or 2 (the shield being perforated at this point to permit light from 17 to pass through it), or directly against the face of the casing 2 when the neon tube is omitted as shown in Fig. 9. These are convenient arrangements for mounting the illuminators. The electrical connections for the light sources 17 and 18 within the case are not completely illustrated since suitable connections can be devised readily. Terminals in the walls of the case through which current enters for the light source 17 are shown at 41. When a low voltage lamp is used at 17 it can be lighted by a battery connected to these terminals. However a low voltage lamp can be lighted by connection to an ordinary lighting circuit in the manner shown in Fig. 1, that is to say by inserting an electrical resistance 42 in the leads between the lamp 17 and the plug 44 by means of which the connection is made to the supply circuit, this resistance being sufficient to reduce the voltage to the proper value for the lamp. The terminals in the walls of the casing through which the current enters for the flashing light source 18 in the device shown appear at 45 and 46. Any means suiting the situation in hand can be used for providing the flashing current for the neon tube. Usually however I connect the terminals 45 and 46 direct to the secondary winding 51 of an induction coil; the switch shown in this circuit serves a purpose later explained and it can be assumed for the moment that the blade 52 of this switch is in engagement with the fixed contact 53 and that the parallel circuit is open at the contact 54. The primary winding of the induction coil I connect to the battery 56 and in series in this circuit I place a fixed contact and a cooperating movable contact provided with suitable means or mechanism for engaging and disengaging the two contacts at desired intervals; a condenser can be provided in shunt to these contacts in accordance with induction coil practice. By so constructing this electrical system that the voltage train induced in the secondary circuit of the induction coil with each closing and opening of the series contacts, contains one, and only one, half cycle of voltage of sufficient amplitude to light the illuminator 18, I cause light flashes to come from 18 at desired intervals. As suiting most cases, I usually build the co-operating series contacts and their shunting condenser into a unit 57 having a shaft 58 which carries two cams for actuating the movable contact and which shaft carries also a center point 59 so that by pressing point 59 against the end of a suitably rotating machine shaft the shaft 58 is driven at a desired speed; the series contacts I mount for manual adjustment around the shaft 58 so that (for phase or time adjustment) the shaft can be made to open and close the contacts at any angular position of the shaft; I also so mount the contacts that they can be moved bodily by hand lengthwise of the shaft 58 so that (the two cams being displaced slightly from each other lengthwise of the shaft) either one or both of the cams will operate the contacts, as desired, whereby the contacts can be made to operate (and consequently the flashes at 18 made to occur) either once or twice during each rotation of the shaft. A suitable device of this sort is illustrated and described in my co-pending application Serial No. 83,984, filed January 26, 1926.

The operation of the instrument will be rather evident from the foregoing. As has been pointed out before, the mirror 15 is vibrated in accordance with the vibrations of or in any body 21 against which the pin 8 may be pressed. Or instead of pressing the pin 8 against the vibrating body, the instrument can be used in the manner of seismographs; or in the manner of pallographs. However the pin 8 may be made to move with respect to the base or case, assuming that light is coming from the light source 17 alone, that is to say assuming that either the construction of Fig. 9 is used or that the light source 18 of Figs. 1, 2, 6, 7 and 11 is not flashing, the narrow beam of light reflected from 17 by the mirror will sweep lengthwise along the screen 16, the amplitude of its movement being proportional to, but much greater than, the amplitude of the vibrations being studied.

Due to the persistency of vision, the movement of the narrow beam will not be seen unless the frequency of the vibrations is very low, but a stationary rectilinear light image such as 66 (Fig. 3) or 67 (Fig. 5) for example will be seen through the screen 16; if the light source 17 and mirror 15 are so adjusted that light from 17 is thrown only on one edge of the screen 16, the image will be like 66; on the other hand if the parts are so adjusted that light from 17 is thrown entirely across the screen 16, the image will be correspondingly wider as shown at 67. The length of this rectilinear image (that is its dimension lengthwise of the screen 16), will depend of course on the amplitude of the vibrations of the body being studied. The magnification of the instrument being fixed by design and known, the amplitude of the vibrations of the vibrating body can be determined therefore by measuring the length of the light image 66, 67. For convenience, the screen 16 can be scaled off as indicated at 68, so that the amplitude of the vibrations of the vibrating body can be read directly on the screen 16. When no light is coming from the source 17, but intermittent flashing light is being produced by the source 18, light images more or less like 66 or 67 may be produced on the screen 16 if the flashing and movement of the mirror 15 are widely asynchronous; or if the frequency of the light flashes and the frequency of the vibrations are nearly but not quite equal, a narrow light band like 20 will be seen travelling back and forth over the same part of the screen. If however the frequency of the light flashes is made equal to the frequency of the vibrations and one flash of light is produced per cycle of the vibrations, the image produced on the screen 16 by the light reflected from the source 18 will appear as a stationary narrow band 20; the position of this image to the right or left of the position the image would occupy were the body being studied not vibrating at all, will depend upon the point in the cycles of the vibrations at which the flashes occur. Thus the phase relation between the vibrations and the member or element controlling the flash production (for example the driver of shaft 58) can be determined; it is indicated by the displacement of the image from the position the image would occupy were the body being studied not vibrating. Also by adjusting the phase relation in any way until the flashes are made to occur (as observed by the displacement of the narrow image) in some desired phase relation to the vibrations, the current impulses in the current source 51 are made to occur in the desired phase relation to the vibrations. For example if but one flash per vibration cycle is being produced and by means of the phase adjustments at the unit 57 the resultant single image is brought to a position from which further adjustment forward as well as adjustment back shifts the image toward its mid- or no-vibration position, it is evident that the flashes have been made to occur, and hence current impulses at 51 are being produced, at exactly those instances when the vibrating body 21 to which the pin 8 is applied, reaches its maximum displacements, or at least reaches its maximum displacements in the plane of movement of the lever 6. Usually, however, to determine or secure the desired phase relation, it is more convenient to compare the images produced by two equally spaced flashes per vibration cycle than it is to work with one alone as done above. It is partly for this purpose that I have arranged the unit 57 to produce either one or two flashes per rotation of the shaft 58 at will. According to this method I first set the unit 57 so as to produce two evenly spaced flashes of light at the source 18 during each cycle of the vibrations being studied. Accordingly two light bands 20 appear on the screen 16, or will be made to appear by a phase adjustment at 57, and the two images approach and retreat from each other as the phase relation is changed back and forth. Hence the mid- or no-vibration position, the two extreme positions, and all intermediate positions are more readily found than with a single flash per cycle. Having brought the flashes to the desired phase relation, I now discontinue one of the flashes per cycle, leaving the other. The flash remaining and accordingly the induction of current in the secondary 51 of the induction coil are now timed to the image remaining on the screen.

Still a third method of timing the current impulses with respect to the vibrations of or in the body 21 being examined, and the one which I prefer, employs the constant light source and the flashing light source simultaneously so that images from both these light sources are produced in comparable relation. For example; the device is so arranged that the image from the source 17 is produced at one edge of the screen 16 as shown at 66 in Fig. 3, and the image or images from the source 18 at the other edge as at 20 in the same figure. The ends of the image 66 show steadily and constantly the two extremes of the vibrations. Now by using a single flash from 18 per vibration cycle, and adjusting the phase or timing of the flash (as at 57) until the image 20 stands in at the proper point between the ends of image 66, the flashing and therefore the current impulses, are made to occur in the desired phase or time relation to the vibrations, and this is done quite readily.

Other uses for my invention will be found. Thus for example it can be used for measuring small thicknesses. For this purpose the instrument is laid on a stand with the pin 8 resting against some stationary object and held thereby slightly depressed so that an image like 20 (produced by either light source) appears on the screen. The position of the image on the screen is noted, and then the article to be measured is inserted between the pin and the stationary object. This shifts the image to another position, and the distance between the initial position of the image and its final position, indicates the thickness of the article. Also other methods of timing or determining phase relations will be found. The foregoing descriptions will serve the present purposes however.

The timing of the current (or rather voltage) impulses in 51 with respect to movement of or in bodies, may be used for various things, but it is especially and immediately useful to time a flashing stroboscope with respect to vibrations for study of the vibration phenomenon and its causes, effects and cure. Therefore as illustrative of the use to which this part of my invention can be put, I have shown in Fig. 1 an arrangement of a flashing stroboscope with the apparatus already described. At 62 is a metal reflector carried on a handle 63 and containing a source of flashing light, for example a neon tube. One of the electrodes of this illuminator is connected to the contact 54 of the series switch before referred to, and the other electrode is connected to the opposite side of the secondary winding of the induction coil as shown. This series switch 52, 53, 54 provides for the alternative connection of the light source 18 or the stroboscopic flasher 62 to the secondary winding 51 of the induction coil as will be apparent; I have found that it is more feasible to arrange two neon tubes for alternate parallel connection than it is to connect in them permanently either in series or in parallel, and hence this arrangement. The blade 52 of the switch being engaged with 53 and the flashing on screen 16 being timed as desired, simply throwing the blade 52 to contact 54 causes 62 to produce light flashes in the same time relation. By means of this flashing light, of known timing, the vibrating body and its associated parts can be studied in various ways as will be understood.

Fig. 8 not only illustrates the use of the weight 27 (which as before explained is particularly useful when the instrument is held in the hand) but it illustrates also a modification of the lever end of the instrument that I have used. The shield tube 5 here extends longitudinally from the head 3 which preferably is made rotatable for convenience in use as before explained. The spindle 14 carrying the mirror 15 is mounted in the head 3 as appears from the figure. The tension of the spring 24 is adjustable by means of the sliding bolt 71 which is held in adjusted position by the set screw 72. The head 3 is held to the cylinder 1 by a set screw or set screws 73 riding in a groove in the part of the head 3 that extends into the cylinder 1. Spring-pressed balls 74 and corresponding recesses 75 may be provided to frictionally hold the head in either one of its two possible positions. Since however this arrangement has only two convenient positions (either with the pin 8 pointing to the left or the pin 8 pointing to the right), I prefer the construction illustrated in Figs. 2 and 7.

It will be understood that my invention is not limited to the details illustrated and described above except as appears hereinafter in the claims.

I claim:

1. In a vibrometer, a base structure, a lever, one arm of the lever protruding from the base structure so as to be capable of being applied to a part to be examined, a pivot pin providing the fulcrum for said lever, said pivot pin being mounted directly on said base structure, a mirror operatively associated with the other lever arm for movement by the lever, means for lighting the mirror, spring means to turn the lever in one direction, and means to receive light reflected by the mirror.

2. In a vibrometer, a base structure, a system including a movably mounted mirror and a lever to move the mirror, one arm of the lever protruding from the base structure so as to be capable of being applied to a part to be examined, a pivot pin providing the fulcrum for said lever, said pivot pin being mounted directly on said base structure, means for lighting the mirror, spring means to turn the lever in one direction, and means to receive light reflected by the mirror, said last mentioned means being so related that the light reflected thereon moves greater distances than the mirror when the mirror is moved by the lever.

3. In a vibrometer, the combination of a base, spring-pressed means movably mounted on said base and protruding therefrom so as to be capable of being brought into engagement with a moving part to be examined and urged in a direction to retain contact with a moving part to which it is applied, a mirror operatively associated with said means to be moved thereby, means for lighting the mirror, a screen to receive light from said mirror, and means to change the tension of the spring pressure on the first mentioned means.

4. The subject matter of claim 2, characterized by the fact that the lever is a lever of the first class.

5. A vibrometer comprising a base, a member pivoted to the base and protruding from the base for application to a part to be examined, a mirror separately pivoted to the base, means connecting the mirror and said member so that the latter turns the mirror, means for lighting the mirror, and means for receiving light reflected from said mirror, the last mentioned means being farther from the center of rotation of the mirror than the mirror.

6. The subject matter of claim 5 characterized by the facts that the member is pivoted for movement in a single plane when applied to a moving part, the mirror is pivoted for movement in a single plane, and the member is arranged to follow closely the movement of a part to which it is applied.

7. A vibrometer comprising a base, a head manually rotatable thereon about a substantially horizontal axis, a lever mounted on said head, one arm of the lever being arranged to be applied to a part to be examined at a point displaced from the axis of rotation of said head, a mirror operatively associated to the lever for movement thereby as the lever is moved by a part under examination, means for lighting the mirror, and means for receiving light reflected from said mirror.

8. A vibrometer comprising a base, a head manually rotatable thereon about a substantially horizontal axis, a lever mounted on said head for pivotal movement in a plane substantially parallel to said axis and for bodily rotation with the head, one arm of the lever being arranged for application to a part to be examined at a point displaced from the axis of rotation of the head, a mirror movably mounted on the base, means connecting said mirror to said lever for movement by the latter at a point on the latter adjacent the axis of rotation of said head, means for lighting the mirror, and means for receiving light reflected by the mirror.

9. The combination of a mirror, means to vibrate the mirror in accordance with the vibrations of a vibrating part, an illuminator for the mirror of the kind capable of furnishing substantially instantaneous flashes of light at a controlled frequency, and means to receive the light from said illuminator reflected by the mirror.

10. The combination of a mirror, means to vibrate the mirror in accordance with the vibrations of a vibrating part, illuminating means for the mirror for furnishing a continuous light and also capable of furnishing simultaneously substantially instantaneous flashes of light at a controlled frequency, and means to receive the light from said illuminating means reflected by the mirror.

11. The subject matter of claim 10 characterized by the fact that said illuminating means comprises two illuminators, one for furnishing the continuous light and the other the flashes, the two illuminators being so related that reflections from the two illuminators appear on different but juxtaposed parts of the means for receiving the light.

12. In a vibrometer, the combination of a base, a member mounted for movement on said base in a plane and arranged to be rested against and make substantially a single point of contact with a moving part to be examined so as to be moved thereby in said plane, a mirror connected to said member for movement by the latter, means for lighting the mirror, means providing a light-transmitting slot, substantially transverse to the direction of movement of the mirror, interposed between the mirror and the means for lighting the mirror, and means for receiving light reflected by said mirror through said slot.

13. The subject matter of claim 12, characterized by the fact that a lens for spreading the light substantially transversely of the direction of the movement of the mirror, is interposed between the mirror and the means for lighting the mirror.

14. A vibrometer comprising a casing, a head mounted thereon for manual rotation on a substantially horizontal axis, a lever mounted on said head and extending substantially radially of the axis of rotation of the head, one arm of the lever being arranged to be applied to a part to be examined and the other arm of the lever extending to substantially the axis of rotation of said head, a mirror on a spindle mounted on said casing, a connection between the mirror spindle and the lever at a point thereon substantially at the axis of rotation of said head, means for lighting the mirror, and means for receiving light from said lighting means reflected by the mirror, the last mentioned means being farther from the axis of the spindle than the mirror.

15. The subject matter of claim 14, characterized by the fact that the means for lighting the mirror comprises an electric incandescent lamp and a flash illuminator, both being carried by the casing.

16. A vibrometer comprising a base, a head manually rotatable thereon about a substantially horizontal axis, a system carried by said base including a movable mirror and a lever to move the mirror as the lever is moved by a part under examination, said lever being mounted on said head and one arm of said lever being arranged to be applied to a part to be examined at a point displaced from the axis of rotation of said head, means for lighting the mirror, and means for receiving light reflected from said mirror.

17. A vibrometer containing a base, a head manually rotatable thereon about a substantially horizontal axis, a lever mounted on said head for pivotal movement in a plane substantially containing said axis and for bodily rotation with the head, one arm of the lever being arranged for application to a part to be examined at a point displaced from the axis of rotation of the head, a mirror movably mounted on the base, means connecting said mirror to said lever for movement by the latter at a point on the latter adjacent the axis of rotation of said head, means for lighting the mirror and means for receiving light reflected by the mirror.

PETER DAVEY.